(No Model.) 2 Sheets—Sheet 2.
A. C. EDDY.
APPARATUS FOR WORKING VULCANIZABLE GUM COMPOUNDS.
No. 277,018. Patented May 8, 1883.
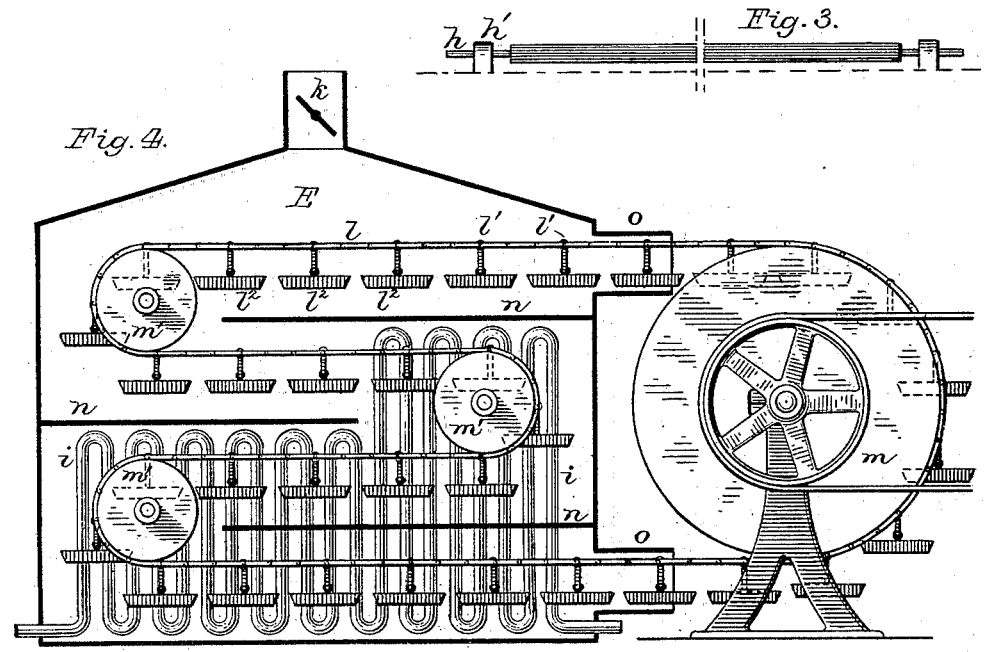
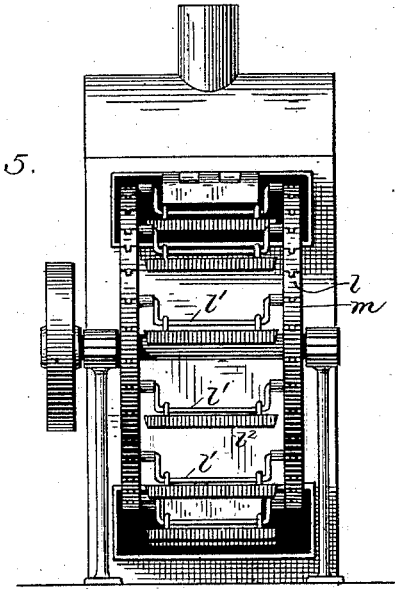

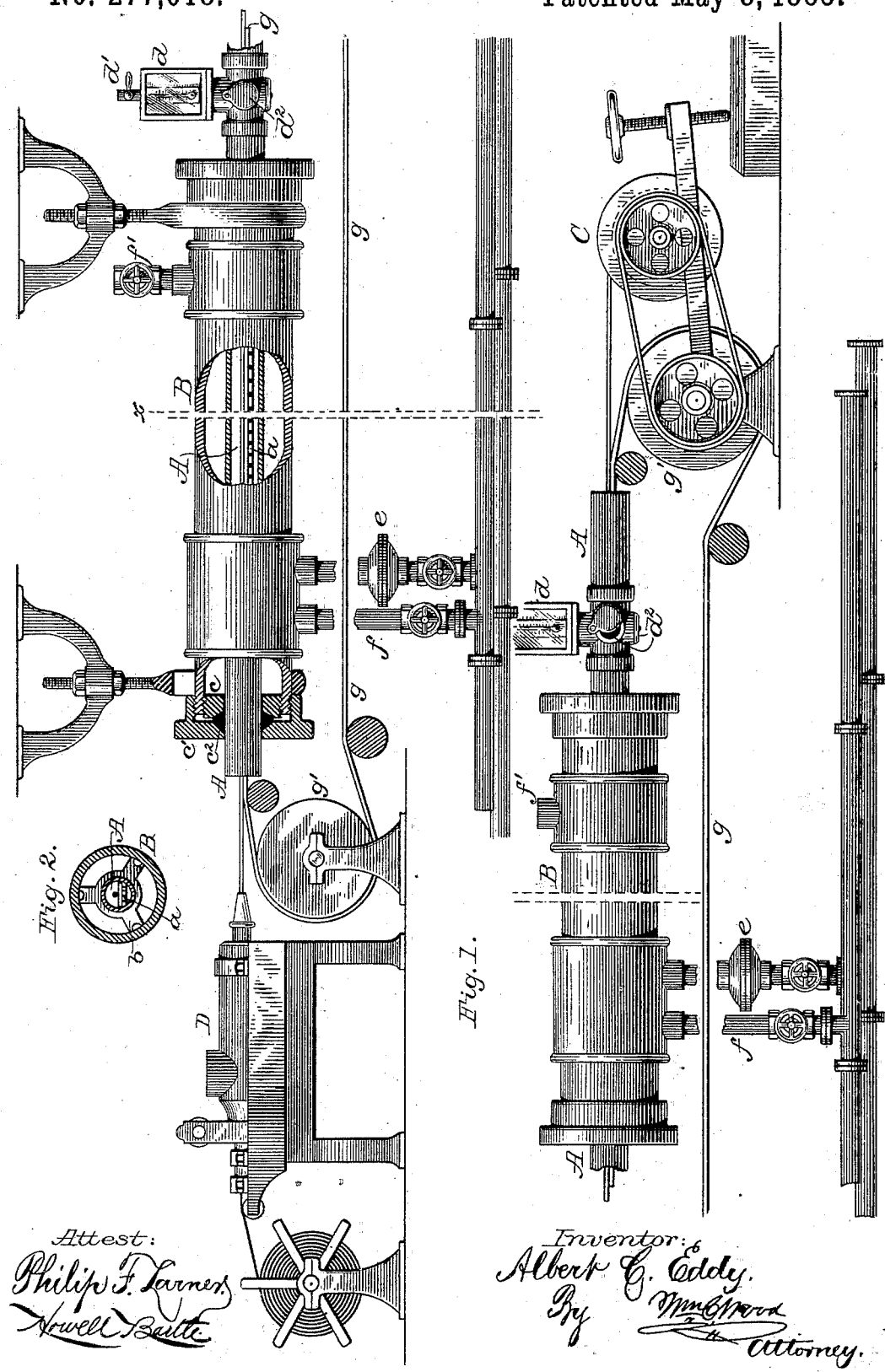

UNITED STATES PATENT OFFICE.

ALBERT C. EDDY, OF PROVIDENCE, RHODE ISLAND.

APPARATUS FOR WORKING VULCANIZABLE GUM COMPOUNDS.

SPECIFICATION forming part of Letters Patent No. 277,018, dated May 8, 1883.

Application filed February 27, 1883. (No model.)

*To all whom it may concern:*

Be it known that I, ALBERT C. EDDY, of the city and county of Providence, in the State of Rhode Island, have invented certain new and useful Improvements in Apparatus for Working Vulcanizable Compounds of Caoutchouc and Analogous Gums and Vulcanizing the Same; and I do hereby declare that the following specification, taken in connection with the drawings furnished and forming a part of the same, is a clear, true, and complete description of my invention.

My improved gum working and vulcanizing apparatus has been devised by me with reference to the successful working of certain improvements in the art of working and vulcanizing gum compounds invented by me and constituting the subject of an application for Letters Patent heretofore filed by me. My said prior improvement, broadly stated, consists, mainly, in subjecting or exposing articles composed wholly or in part of vulcanizable gum compounds to the proper degree of heat and for a proper length of time while said articles are in motion continuously or intermittingly within vulcanizing-chambers, and with reference to articles of great length, my said prior improvement involves, also, the movement of said articles without tension thereon during the vulcanizing process.

With my novel vulcanizing apparatus in its best form I employ, in accordance with certain features of my present invention, any of the well-known machines for working vulcanizable gum compounds into articles or goods of great length composed wholly or in part of said compounds, it being understood that my present invention relates to no improvements in such machines separately considered, but in the combination therewith of my novel vulcanizing apparatus, whereby such goods may be delivered continuously from any one of said machines directly to the vulcanizing apparatus, wherein the vulcanizing operation can be progressively or continuously performed, and thereby obviate the cost of intermediate handling of such goods, the liability of injury thereto incident to their handling in a soft or green state, and economizing in the matters of heat and rapidity in vulcanization, it being well known that with all such machines the gum compounds are worked in a heated condition. One type of the machines referred to for delivering rubber goods therefrom in great length may be found in the electric-wire-covering machine patented to Sault, December 9, 1862, No. 37,112, the same being also adapted to produce tubing in continuous length. Another machine of this general class is the well-known "calendering-machine," which applies, by means of rolls, a coating of compound to cloth in the piece, and so, also, is the well-known "knifing-machine," wherein a coating of compound is applied by a vibrating knife or knives to cloth in the piece; and it is so obvious that all of these machines work substantially the same, so far as relates to the direct delivery of goods therefrom to my vulcanizing apparatus, that I do not deem it essential to illustrate more than one of said machines as employed by me.

After fully describing my improved apparatus, the features deemed novel will be specified in the several claims hereunto annexed.

Referring to the drawings, Figure 1 is a side view of my novel apparatus as organized for working and vulcanizing articles of great length, the vulcanizing-chamber being broken at intervals and shown partially in longitudinal section. Fig. 2 is a lateral vertical section of the vulcanizing apparatus on line x. Fig. 3 is a view of a length of rubber tubing mounted on an arbor and its standards, as when vulcanized in the apparatus, Fig. 1. Figs. 4 and 5 are respectively a vertical central section and an end view of my apparatus as organized for vulcanizing small goods.

I will first describe the apparatus shown in Figs. 1 and 2 as arranged for vulcanizing rubber-covered wire delivered continuously by a suitable machine for applying the rubber to the wire, and it will thereafter be obvious that rubber-covered twine, cord, tapes, &c., or rubber tubes may in like manner be readily covered and vulcanized by the same apparatus, and that it will only be necessary to vary the form and proportions of the vulcanizing apparatus to adapt it to receive rubber-coated cloth delivered directly from a knifing-machine, or from a calender or other suitable machine, for applying the vulcanizable gum compound to cloth in the piece.

The vulcanizing-chamber A is composed of a series of suitable iron pipes tightly connected at their ends, so as to constitute a continuous tubular chamber varying in length according to circumstances. As the vulcanization of the gum compound is performed during the passage of the article or goods through said chamber, it is obvious that its length may be varied according to whether the movement of said article be rapid or slow, it being obvious that the greater the speed of the article during its passage the greater should be the length of the chamber, and if the delivery of the article to be vulcanized be directly from a machine, as hereinafter more fully described, the length of the chamber should be proportioned to the capacity of said machine for delivering the goods. In practice the length of said chamber need seldom, if ever, be greater than five hundred feet; but under some circumstances chambers of twice that length may be advantageously employed. This chamber is open at both ends, and is provided throughout its length with a stationary flat bed, $a$, preferably smoothly perforated, which, under some circumstances, may be profitably employed without a movable bed, as hereinafter described. In sectional outline the vulcanizing-chamber is preferably circular; but it may be varied in that respect according to particular requirements. The chamber is heated by means of a steam-jacket, B, composed of a series of larger pipes tightly connected at their ends, and said chamber is maintained centrally therein by hubs. $b$, which loosely embrace the chamber, and have radial arms which loosely occupy the steam-jacket. It is obvious that the longitudinal expansion and contraction incident to heating and cooling the outer and inner pipes render it important, in view of their great length, that each may expand or contract independently of the other, and therefore the hubs $b$ are not confined to the inner or the outer pipes, and the ends of the jacket are constructed so as to form slip-joints, or, in other words, so as to telescope or slide upon the inner pipe, and at the same time afford a steam-tight connection. As clearly indicated in the drawings, the chamber-pipe A, for a suitable distance at each end, is externally turned off and well finished for the reception of an annular head, $c$, which is tapped into the jacket-pipe B, and this latter, at its end, is externally threaded for the reception of a screw-cap or gland, $c'$, so that packing, as at $c^2$, can be properly compressed, and thereby afford a steam-tight telescopic joint. If the chamber be other than circular in outline, the slip-joints may be provided by means of externally-cylindrical sleeves of proper length attached to the outside of the chamber. The steam-jacket B may be continuous throughout the length of the chamber, or it may be composed of separate sections, as is preferable with the greatest lengths of vulcanizing-chambers, leaving a short length of the inner pipe intervening for the ready application of thermometers for determining the degree of heat in different parts of the chamber. The thermometers are located within tight glass front boxes, $d$, internally communicating with the chamber, and provided with a pipe and cock, as at $d'$, for enabling a proper circulation of heated air within the box. At $d^2$, on each side and at the bottom of the chamber, are openings or air-vents covered by caps or valves, which can be removed or opened for cooling down the chamber or permitting the free discharge of heat when less than the full length of the chamber is required for service. For properly freeing the steam-jacket of the water incident to condensation of steam, the chamber and its jacket are slightly inclined to afford a water-grade, and at intervals suitable steam-traps, $e$, are provided, for permitting the discharge of water while retaining the steam. The steam-induction pipes $f$ and eduction-pipes $f'$ are provided with suitable cocks for properly controlling the pressure of steam within the jacket, and the consequent degree of heat within the vulcanizing-chamber. In view of the great length of the apparatus and the necessity of maintaining it always in a straightened and properly-graded condition, its supports should be capable of vertical adjustment. If wholly located within a building, the chamber as a whole may be suspended by stirrups hanging from the roof or ceiling beams and provided with screw-threaded straps for enabling vertical adjustment, or it may be supported on vertical standards screw-threaded and occupying tubular bases, and provided with nuts whereby said vertical adjustment can be readily made. When the steam-jacket is in one continuous length a single steam-induction pipe may be relied upon; but when said jacket is constructed in sections each section is separately connected to a steam-supply pipe common to all the sections. If desired, each end of the vulcanizing-chamber may be located within a separate building, in which case the intervening portion of the chamber should be housed from the weather and properly covered with asbestus or other good non-conductor of heat. In some cases each end of the vulcanizing-chamber may be partially closed and have only sufficient area of opening to allow for the free passage of the movable bed and the article carried thereon. Sheet-metal caps constructed in two parts can be readily applied to and removed from the ends of the vulcanizing-chamber.

With the apparatus as thus far described it will be seen that vulcanizable goods of great length can be drawn through the chamber initially by means of a cord or wire, the stationary bed being well supplied at its entrance with powdered soapstone or equivalent powdered matter, for preventing adhesion of the goods to the bed and enabling them to slide freely thereon, and that the vulcanization of the goods will be fully accomplished during their passage, and also that they can be readily coiled or rolled in a finished condition as they leave the chamber.

In view of the fact that many kinds of goods in great length cannot be passed through the chamber by draft or tension on the goods without injury thereto, I have provided the chamber with a moving bed, $g$, which is supported upon and by the stationary flat bed $a$ within the chamber. This movable bed may be variously constructed; but I prefer it in the form of an endless belt passing over two drums, $g'$, to one of which power is applied, preferably the one at the delivery end of the vulcanizing-chamber. This belt may be variously constructed; but good results can be obtained by using a thin sheet-metal belt, which can be used with or without a surface-cover of woven fabric, powdered matter being employed in either case to prevent adhesion of the goods. This belt or movable bed should be somewhat narrower than the stationary perforated bed, so as to freely admit of a circulation of air from beneath said bed. For occasionally clearing the space beneath the stationary bed of the powdered matter liable to accumulate therein, I provide an endless wire, (not shown,) which always occupies said space, and by attaching a clearing-swab thereto the latter may be readily moved from one end of the chamber to the other.

For coiling up wire or other goods of great length after they leave the chamber, I provide reeling or winding mechanism C, and to enable the latter to coil or wind the goods without unduly lifting them from the bed, said mechanism is mounted upon a vertically-adjustable platform, so that the upper side of a coil or roll of the goods can be maintained at substantially the same height as the surface of the bed. Other forms of winding or coiling mechanism may be employed without departure from my invention.

It will be obvious that the movable bed in this apparatus can be employed in vulcanizing small articles as well as those of great length. In vulcanizing tubing in great lengths it is fed to the bed directly from the machine, as with the covered wire; but if tubing in shorter lengths is to be vulcanized on arbors, as illustrated in Fig. 3, the arbor $h$ is supported at each end by the loose collars $h'$, which are flattened at the bottom, as shown, to afford steady bearings upon the movable bed.

With this form of my vulcanizing apparatus adapted for continuous vulcanization, I combine, for obtaining the best results, the machine by which the gum compounds are worked into the form desired preparatory to vulcanization, and by which they are continuously delivered, as from a knifing-machine or from a calendering-machine, both for coating cloth in great lengths, or from a tubing-machine, or from a wire-covering machine, each and all of which deliver goods in great length continuously in proper condition for vulcanization.

I have shown in Fig. 1, at D, a machine capable of covering wire or cord with vulcanizable compound, or of making tubing composed wholly of gum compound, and in either case it is capable of continuously delivering the goods in great length; and such a machine being well known and fully described in United States Letters Patent No. 37,112, issued to T. Sault, December 9, 1862, a particular description thereof is deemed unnecessary for the purposes of this specification.

It is well known that machines for working rubber goods in great length vary in their capacities as to speed in delivering said goods, and therefore in each case the vulcanizing-chamber must be so proportioned thereto as to length that the goods moving through said chamber at the speed of delivery by the machine shall be properly vulcanized before their exit from the chamber.

It will be obvious, with my vulcanizing-chamber, say, one thousand feet in length, and having the steam-jacket in independent lengths or sections, that exposure to vulcanizing-heat can be accurately adjusted to the speed of delivery of the goods by any one of the machines of the class referred to, as well as to the particular character of said goods, the hot-air exits at $d^2$ enabling the chamber to freely discharge its heat for reducing temperature or for enabling any portion of the chamber less than the whole to be employed in active service. With respect of the movable bed and coiling or winding mechanism, it is obvious, whether one or both be used, that they should be driven in exact harmony as to speed with the machine which is delivering the goods to the chamber. In using the Sault machine or others involving high pressures upon the gum compound for forcing it through dies, said compound is necessarily or inevitably highly heated, especially when the machines are also heated by steam, so that the goods delivered therefrom are frequently at a temperature closely approximating to a vulcanizing-heat, and therefore whatever heat is thus developed in working the gum is fully utilized by me in vulcanizing such goods; and the same is true in the manufacture of tubing in such machines, and also in the coating of fabrics by knifing or calendering machines, which operate on heated gum compounds.

In Figs. 4 and 5 I show a vulcanizing apparatus organized for vulcanizing small goods only. In this apparatus the vulcanizing-chamber E contains a suitable number of steam-coils, $i$, as heretofore employed for properly heating the chamber; and it is also provided with the usual vent-flue and valve or damper in the top thereof, as at $k$. The movable bed in this apparatus embodies a pair of endless chains, $l$, cross-bars $l'$, and perforated or skeletonized pendent pans or trays, $l^2$. Said bed is mounted upon a series of drums or disks, one pair of which, at $m$, is of large diameter outside of the chamber, and the others, at $m'$, within the chamber, are so located therein that the bed, when in motion, travels to and fro at different levels.

As shown in the drawings, three pairs of the drums or disks $m'$ are employed, enabling the chamber to accommodate therein a bed more than four times the length of said chamber. The trays or pans $l^2$ are loosely suspended by means of links and free collars on the cross-bars $l'$, so that said pans maintain a horizontal position while the cross-bars are passing over and around a drum or disk. These disks may be mounted on studs or on axles; but in this latter case the pendent links for the pans must be less in length than when the disks are mounted on studs; but in all cases the length of said links and the depth of each pan must be less than the distance between the cross-bars, so as to prevent the contact of the pans with the next preceding bars during their movements around said disks. Lateral diaphragms, as at $n$, are located at proper points within the chamber to secure as uniform distribution of heat as possible. Spout-like extensions, as at $o$, are provided at the front of the chamber for the entrance and exit apertures of the moving bed, and the diaphragms $n$ within the chamber are arranged, as indicated, to reduce as far as possible the undue exit of heated air, and, by having the cross-bars $l'$ bent downward near each end to within a short distance above the tops of the pans, swinging plates depending from the upper sides of the extensions $o$ can be used for reducing the area of each opening to a minimum. Power is applied to the large drums or disks $m$, and such slow speed is given to the bed as will insure the proper exposure of the goods to heat within the chamber during their transit from the entrance to the exit thereof. The charging and emptying of pans or trays is performed at the front of the large drum $m$, and in some cases the chamber incloses the entire bed, requiring only a small opening in front for charging and discharging the pans.

Having thus described my invention, I claim as new and desire to secure by Letters Patent—

1. The combination, substantially as hereinbefore described, of a vulcanizing-chamber having suitable apertures for feeding and discharging, and a movable bed extending throughout said chamber, whereby vulcanizable goods may be continuously fed to and discharged from said chamber.

2. The combination, substantially as hereinbefore described, of a vulcanizing-chamber having an induction and eduction aperture and an intervening bed and coiling or winding apparatus, whereby articles of great length can be vulcanized during their passage through said chamber and thereafter coiled or wound in a finished condition.

3. The combination, substantially as hereinbefore described, of a vulcanizing-chamber having an induction and eduction aperture, a movable bed, and coiling or winding apparatus, whereby goods of great length can be passed through said chamber and vulcanized in transit without tension thereon.

4. A tubular vulcanizing-chamber provided with a series of steam-jackets, each having independent steam induction and eduction pipes, substantially as described, whereby the whole or any portion of said chamber can be heated for service, as set forth.

5. A tubular vulcanizing-chamber open at each end, and provided with steam-jackets and with the air-vents having caps or valves, substantially as described, whereby the heat can be retained in or freely discharged from said chamber at various points throughout its length.

6. The combination of the tubular vulcanizing-chamber, open at each end for feeding and discharging, and a tubular steam-jacket slip-jointed thereon, substantially as described, whereby said chamber and jacket are independently enabled to longitudinally expand and contract, as set forth.

7. The combination, substantially as hereinbefore described, of mechanism for working vulcanizable gum compounds into proper form for vulcanization, and a vulcanizing-chamber containing a movable bed and adapted to continuously receive the product of said gum-working mechanism, and to vulcanize the same during its passage through said chamber.

8. The combination, substantially as hereinbefore described, of mechanism for working vulcanizable gum compounds into articles of great length, composed wholly or in part of said compounds, a coiling or winding mechanism, and a vulcanizing-chamber interposed between the gum-working and the coiling mechanism, whereby the product from the gum-working mechanism is delivered to and drawn through said chamber, is vulcanized therein, and then coiled in a finished condition.

9. The combination, substantially as hereinbefore described, of mechanism for working vulcanizable gum compounds into articles of great length, composed wholly or in part of said compounds, coiling or winding mechanism, and a vulcanizing-chamber containing a movable bed, whereby the product of the gum-working mechanism is delivered to and carried through said chamber, is vulcanized therein without tension, and is coiled in a finished condition on leaving said chamber.

10. A tubular vulcanizing-chamber, open at each end for the entrance and exit of articles to be vulcanized therein, a flat bed within and extending throughout the length of said chamber, and a steam-jacket, substantially as described.

ALBERT C. EDDY.

Witnesses:
PHILIP F. LARNER,
HOWELL BARTLE.